(12) United States Patent
Bouzaraa et al.

(10) Patent No.: US 9,916,646 B2
(45) Date of Patent: Mar. 13, 2018

(54) SYSTEM AND METHOD FOR PROCESSING INPUT IMAGES BEFORE GENERATING A HIGH DYNAMIC RANGE IMAGE

(71) Applicant: Huawei Technologies Co., Ltd., Shenzhen (CN)

(72) Inventors: Fahd Bouzaraa, Munich (DE); Giovanni Cordara, Munich (DE); Onay Urfalioglu, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/245,402

(22) Filed: Aug. 24, 2016

(65) Prior Publication Data
US 2016/0364847 A1    Dec. 15, 2016

Related U.S. Application Data

(63) Continuation of application No. PCT/EP2014/053509, filed on Feb. 24, 2014.

(51) Int. Cl.
*G06T 5/00* (2006.01)
*G06T 5/50* (2006.01)
*G06T 5/40* (2006.01)

(52) U.S. Cl.
CPC .............. *G06T 5/007* (2013.01); *G06T 5/005* (2013.01); *G06T 5/40* (2013.01); *G06T 5/50* (2013.01);
(Continued)

(58) Field of Classification Search
CPC ........... G06T 5/007; G06T 5/50; G06T 5/005; G06T 5/40; G06T 2207/20208; G06T 2207/10004
See application file for complete search history.

(56) References Cited

U.S. PATENT DOCUMENTS

2005/0013501 A1    1/2005  Kang et al.
2015/0078661 A1*   3/2015  Granados ............... G06T 5/009
                                                              382/167

FOREIGN PATENT DOCUMENTS

EP          2395748 A2    12/2011

OTHER PUBLICATIONS

Jinno et al: "Multiple Exposure Fusion for High Dynamic Range Image Acquisition", IEEE, 2012.*
(Continued)

*Primary Examiner* — Ruiping Li
(74) *Attorney, Agent, or Firm* — Conley Rose, P.C.

(57) ABSTRACT

An image processing system for generating a high dynamic range image from a first image and a second image is presented. The system comprises a first displacement estimator adapted to estimate a displacement of image content between a reference image derived from the first image and an image to be warped derived from the second image. The system comprises a first warping unit that compensates the estimated displacement by warping the image to be warped resulting in a first warped image. The system comprises a first error detector adapted to detect geometric warping errors within the first warped image and a first error compensator adapted to compensate the estimated geometric warping errors within the first warped image resulting in a first error corrected image. The system comprises a high dynamic range calculator adapted to calculate the high-dynamic range image based upon the first error corrected image and the reference image.

20 Claims, 5 Drawing Sheets

(52) U.S. Cl.
CPC ............... *G06T 2207/10004* (2013.01); *G06T 2207/10012* (2013.01); *G06T 2207/10144* (2013.01); *G06T 2207/20208* (2013.01); *G06T 2207/20216* (2013.01)

(56) References Cited

OTHER PUBLICATIONS

Lucas et al: "An Iterative Image Registration Technique with an Application to Stereo Vision", proc. DARPA, 1981.*

Chen, W., et al., "Efficient Depth Image Based Rendering with Edge Dependent Depth Filter and Interpolation," 2005, 4 pages.

Grosch, T., "Fast and Robust High Dynamic Range Image Generation with Camera and Object Movement," Jan. 2006, 9 pages.

Ward, G., "Fast, Robust Image Registration for Compositing High Dynamic Range Photographs from Handheld Exposures," 2003, 14 pages.

Zimmer, H, et al., "Freehand HDR Imaging of Moving Scenes with Simultaneous Resolution Enhancement," Preprint Nr. 286, 2010, 24 pages.

Srikantha, A., et al., "Ghost detection and removal for high dynamic range images: Recent advances," Signal Processing: Image Communication 27, 2012, pp. 650-662.

Lin, H., et al., "High Dynamic Range Imaging for Stereoscopic Scene Representation," ICIP 2009, pp. 4305-4308.

Troccoli, A., et al., "Multi-view multi-exposure stereo," Proceedings of the Third International Symposium on 3D Data Processing, Visualization, and Transmission, 2006, 8 pages.

Zhang, L., et al., "Stereoscopic Image Generation Based on Depth Images," International Conference on Image Processing, 2004, pp. 2993-2996.

Vazquez, C., et al., "Stereoscopic Imaging: Filling Disoccluded Areas in Depth Image-Based Rendering," Proceeding of SPIE, vol. 6392, 2006, 12 pages.

Tsai, D., "A fast thresholding selection procedure for multimodal and unimodal histograms," XP000506598, Pattern Recognition Letters, vol. 16, Jun. 1995, pp. 653-666.

Sezgin, M., et al., "Survey over image thresholding techniques and quantitative performance evaluation," XP002388762, Journal of Electronic Imaging, vol. 13, No. 1, Jan. 2004, 23 pages.

Foreign Communication From a Counterpart Application, European Application No. 14706303.6, European Office Action dated May 3, 2017, 9 pages.

Foreign Communication From A Counterpart Application, PCT Application No. PCT/EP2014/053509, International Search Report dated Oct. 28, 2014, 6 pages.

Foreign Communication From A Counterpart Application, PCT Application No. PCT/EP2014/053509, Written Opinion dated Oct. 28, 2014, 7 pages.

* cited by examiner

SYSTEM AND METHOD FOR PROCESSING INPUT IMAGES BEFORE GENERATING A HIGH DYNAMIC RANGE IMAGE

CROSS-REFERENCE TO RELATED APPLICATIONS

This application is a continuation of International Application No. PCT/EP2014/053509, filed on Feb. 24, 2014, which is hereby incorporated by reference in its entirety.

TECHNICAL FIELD

The present disclosure refers to an image processing system and an image processing method for generating a high dynamic range image from at least two input images.

Particularly, the present disclosure refers to a system and method, which process the input images before performing a high dynamic range image calculation.

BACKGROUND

In numerous applications related to computer vision and computational photography, the topic of image registration plays a central role: in particular, it is used when the need arises to associate the pixels of one image with corresponding pixels (pixels depicting the same point in the captured scene) in another image.

The problem of matching pixels in different images is quite common in computer vision applications based on extracting information from multiple images in order to increase their quality or to detect the geometry of the scene. In this context, typical challenges addressed by image registration are the elimination of perspective differences observed in stereo images, manipulation of dynamic scenes, where motion in the set of captured images can be observed (e.g. two sequential images capturing moving objects), and compensation of the camera movement where sequential images are captured with handheld cameras.

Accordingly, image registration plays an important role in manipulation scenarios which fall under the scope of computational photography, such as high dynamic range imaging (HDRI). HDRI enables to computationally increase the dynamic range of images captured using digital cameras, which are incapable of reproducing the entire dynamic range of the real world scenes, mainly due to hardware limitations. An exemplary approach for HDRI relies on capturing several images (sequentially or simultaneously with stereo/multiple cameras) at different exposures (exposure bracketing), and then merging them into a High Dynamic Range image.

Based on the information gained from the differently-exposed input images, the inverse camera response function (CRF) is estimated, which enables the reconstruction of a scene radiance map (estimation of the original light energy received as input by the camera sensor) with increased dynamic range. The extended dynamic range is then remapped using a tone mapping operation, into a low dynamic range format displayable by common displays. The radiance map is normally computed by a weighted sum of the corresponding pixels from the input images, assigning different weights according to the level of exposure of the original images.

The present disclosure can be applied to any method for CRF estimation, tone mapping and weighting for scene radiance map computation.

In case where two or more images are taken sequentially, and assuming the depicted scene and the camera are static (no motion during the capturing process), the high dynamic range (HDR) computation doesn't present particular problems. This is because it is assumed that the input images are perfectly geometrically aligned, which in turn means that all image content has the same location in all input images. Nevertheless, this is a very uncommon case in practice: typically, during the time needed to capture the input images with different exposure settings, movements of the capturing device or objects in the scene occur. Consequently, the captured images are not perfectly aligned any more. When images are captured through a stereo/multi-camera case, the simultaneous image capturing does not have the problem of moving objects as occurring in sequential capturing. However, the baseline difference between the cameras causes occlusions and perspective distortions that need to be compensated.

In case the motion or disparity compensation is not carried out correctly, the radiance map in certain areas of the image is computed by weighting wrong pixels, thus resulting in severe and evident ghosting artifacts. Areas with distortions caused by dynamic changes or occlusion will also be referred to as "ghosted areas".

Therefore, the quality of HDRI and other applications based on multiple images of the same scene, depends strongly on the motion (or disparity in the stereo/multi-camera scenario) compensation operation between different images to generate consistent results.

The compensation of motion due to moving cameras or objects in the scene, or disparity of the stereo/multi-camera baseline, represents an important research field with the goal of reducing the artifacts observable in the ghosted areas. This is especially the case for 2-dimensional (2D) (sequential images), where several approaches were developed.

The existing methods for motion and disparity compensation can be classified into two main groups: the first group of motion compensation techniques aims at reducing the visible artifacts in the ghosted areas computing radiance values, in those areas, only on the basis of one image. Accordingly, this requires a detection of ghosted areas.

Recently, a method for detecting misalignments due to camera motion during the capturing process was proposed. The detection of the transitional misalignment starts with applying an exposure-invariant transformation, thus detecting the transition that enables the maximum similarity between the transformed maps.

Based on this method, an additional technique for the detection of transitional and rotational misalignments due to camera motion and blurred regions due to moving objects during the capturing was proposed.

The second group of motion/disparity compensation techniques is based on image registration, so that no prior knowledge of the camera settings (e.g. exposure times, inverse CRF . . . ) is required and no detection of ghosted areas is needed. An exemplary method computes a dense motion field using an energy-based optical flow approach, which is invariant to illumination difference between the input images. The computed motion vectors are used for image registration and therefore for motion compensation. HDR images are computed on the basis of such registered images.

The above described solutions for motion and disparity compensation present several limitations which are mostly related to the performance of the enabling algorithm. For instance, the first group of methods treat ghosted areas differently to the rest of the image (namely using only one image for the HDR computation) results in visible artifacts, that can be reduced with the proposed disclosure.

Similarly, methods which fall under the scope of image registration through motion estimation may decrease the dependency on camera settings, but they rely strongly on the performance of the motion/disparity technique such as optical flow. In addition, the results of the motion estimation step will be inaccurate if no proper preprocessing for the purpose of reducing the luminance difference between the input images is performed.

For example, the European patent application EP 2 395 748 A2 shows a conventional system and method for generating a high dynamic range image. The system and method shown there are disadvantageous, since the resulting HDRI image comprises remaining errors.

SUMMARY

The object of the present disclosure is therefore to provide a system and method for generating a high dynamic range image, which achieve very high precision in the image registration phase, thus resulting in high quality HDR image. The above object is achieved by the solutions provided in the enclosed independent claims. Advantageous implementations are defined in the respective dependent claims.

A first aspect of the present disclosure provides an image processing system for generating a high dynamic range image from a first image and a second image. The system comprises a first displacement estimator adapted to estimate a displacement of image content between a reference image derived from the first image and an image to be warped derived from the second image. The displacement can be represented as a local mapping between different parts of the reference image and the image to be warped with pixel, block of pixels, or subpixel, precision. Moreover it comprises a first warping unit adapted to compensate the estimated displacement by warping the image to be warped resulting in a first warped image. Moreover, the system comprises a first error detector adapted to detect geometric warping errors within the first warped image and a first error compensator adapted to compensate the estimated geometric warping errors within the first warped image resulting in a first error corrected image. Also the system comprises a high dynamic range calculator adapted to calculate the high-dynamic range image based upon the first error corrected image and the reference image. By performing the error compensation, it is possible to strongly reduce the number of errors occurred during the displacement estimation phase for use by the high dynamic range calculator. A resulting high dynamic range image with reduced visual artifacts is thereby achieved.

In a first implementation form according to the first aspect of the present disclosure, the first displacement estimator is adapted to estimate the displacement of the image content by estimating the optical flow and/or by performing a block based search and/or by performing a patch matching. Thereby, all the existing methods for motion/disparity estimation can be applied to the current disclosure.

According to a second implementation form of the first aspect of the present disclosure, the first error detector comprises a difference unit adapted to compute intensity differences of each pixel of the first warped image to a corresponding pixel of the reference image. Also it comprises a histogram unit adapted to compute a histogram of the determined intensity differences. Moreover it comprises a threshold determination unit adapted to determine an error threshold from the histogram and an error deciding unit adapted to determine geometric warping errors by comparing the intensity differences to the threshold resulting in a binary map of geometric warping error pixels. A very high accuracy of detected errors can thereby be reached.

According to a third implementation form of the first aspect of the present disclosure, the threshold determination unit is adapted to determine the error threshold so that difference values below the error threshold indicate photometric errors and values above the error threshold indicate geometric errors. By performing such an accurate differentiation between photometric errors and geometric warping errors, a further increase of resulting HDR image quality can be achieved, since allows to distinguish between errors originated by non stationary components of the image acquisition chain (photometric errors), and errors occurred during the registration phase (geometric warping errors).

The error threshold enabling better classification or distinction between photometric errors and geometric warping errors can be adaptively determined analyzing the gradients of consecutive values of the histogram and placing the threshold in the point where the gradient is maximal.

According to a fourth implementation form of the first aspect of the present disclosure, the difference unit is adapted to compute the intensity differences independently for different color channels. The error deciding unit is then adapted to compare the intensity differences of the color channels to the error threshold and to determine a geometric warping error of a pixel if at least one of the intensity differences of the color channels is higher than the error threshold or if the intensity differences of all color channels are higher than the error threshold. A further increase of resulting HDR image quality can thereby be achieved.

According to a fifth implementation form of the first aspect of the present disclosure, the difference unit is adapted to compute the intensity differences independently for different color channels. The histogram unit is than adapted to compute independent histograms for the different color channels. The threshold determination unit is than adapted to determine an independent error threshold for each color channel. The error deciding unit is in this case adapted to compare the intensity differences of the color channels to the according error thresholds and determine a geometric warping error of a pixel if at least one of the intensity differences of the color channels is higher than the according error threshold or if the intensity differences of all color channels are higher than the according error thresholds. At the cost of a slightly higher computational complexity, a further increase of quality of the resulting high dynamic range image can thereby be achieved.

According to a sixth implementation form of the first aspect of the present disclosure, the first error compensator comprises a search window setting unit adapted to set search windows of predetermined or user-defined size around each pixel of the first warped image, for which a geometric warping error was detected. Also the error compensator comprises a valid pixel detection unit adapted to determine, at which pixels within each search window no geometric warping error was detected resulting in valid pixels for each search window. Also, the error compensator comprises a correction value determination unit adapted to calculate correction values for the pixels of the first warped image, at which geometric warping errors were detected, each as an average of the intensities of at least some of the valid pixels of the respective search window. The error compensator furthermore comprises a correction value replacement unit adapted to replace the pixels of the first warped image, at which geometric warping errors were detected by the according calculated correction values resulting in a first error corrected image. A resulting high quality high dynamic range image is thereby achieved while at the same time only requiring a low computational complexity.

According to a seventh implementation form of the present disclosure according to the first aspect, the correction value determination unit is adapted to calculate the correction values each as an average of the intensities of only valid pixels, whose intensity value difference to the intensity value of the presently corrected pixel are below a predetermined or user-selectable correction threshold. The use of pixel values of regions not related to the pixel to be corrected, for example due to the presence of edges of boundaries, resulting in imperfect error correction can thereby be prevented.

According to an eighth implementation form of the first aspect of the present disclosure, the first error compensator comprises a weighting unit adapted to perform a weighting of the valid pixels within the search window based upon the intensity gradients of the first warped image wherein a lower weight is allocated to pixels of high gradient value, such as edges and boundaries, and wherein a higher weight is allocated to pixels of low gradient value, resulting in a weighted map.

The valid pixels can be determined from the binary map of geometric warping errors. The correction value determination unit is than adapted to weight the value pixels of the search windows before calculating the correction values. A further increase of resulting HDR image quality can thereby be achieved.

According to a ninth implementation form of the first aspect of the present disclosure, the image processing system further comprises a first exposure compensation unit adapted to compensate color and luminance differences in a first image and a second image due to different exposure times, by changing a brightness and/or saturation of the first image and/or of the second image resulting in the reference image and the image to be warped. This results in an even more increased quality of the image warping. Alternatively, the first image can be directly used as reference image and the second image can be directly as image to be warped. This leads to a reduced computational complexity.

According to a tenth implementation form of the first aspect of the present disclosure, the image processing system further comprises a second displacement estimator adapted to estimate displacement of image content between the reference image and a further image to be warped derived from a third image and a second warping unit adapted to compensate the detected displacement by warping the further image to be warped resulting in a second warped image. Moreover, it comprises a second error detector adapted to detect geometric warping errors within the second warped image and a second error compensator adapted to compensate the detected geometric warping errors in the second warped image resulting in a second error corrected image. The high dynamic range calculator is than adapted to calculate the high dynamic range image based upon the first error corrected image, the second error corrected image and the reference image. By using more than two images, a further increase in resulting HDR image quality can be achieved.

The extension to systems encompassing more than three images adopts the same approach discussed in this implementation form, with the addition of multiple warping units adapted to compensate the detected displacement, multiple error detections and multiple error compensations to compensate the detected geometric warping errors in the multiple warped images.

According to a second aspect of the present disclosure, a method for generating a high dynamic range image from a first image and a second image is provided. A displacement of image content between a reference image derived from the first image and an image to be warped derived from the second image is estimated. The estimated displacement is compensated by warping the image to be warped resulting in a first warped image. Geometric warping errors within this first warped image are detected and compensated resulting in a first error corrected image. The high dynamic range image is calculated based upon the first error corrected image and the reference image. A high resulting HDR image quality is thus possible.

According to a first implementation form of the second aspect of the present disclosure, the displacement of the image content is estimated by calculating an optical flow and/or by performing a block based search and/or by performing a patch matching. A high accuracy of displacement estimation at a low computational cost is thereby achieved.

According to a second implementation form of the second aspect of the present disclosure, intensity differences of each pixel of the first warped image to a corresponding pixel of the reference image are calculated. A histogram is computed from these intensity differences. An error threshold is calculated from the histogram. Geometric warping errors are determined by comparing the intensity differences to the threshold resulting in a binary map of geometric warping error pixels. A high accuracy of detected geometric warping errors can thereby be achieved. The threshold can be adaptively selected according to the statistics of the histogram of intensity differences.

According to a third implementation form of the second aspect of the present disclosure, the threshold is determined so that difference values below the threshold indicate photometric errors and values above the error threshold indicate geometric errors. By performing this differentiation between photometric errors and geometric errors, the introduction of additional errors by accidently correcting photometric differences can be prevented.

According to a fourth implementation form of the second aspect of the present disclosure, the intensity differences are computed independently for different color channels. The intensity differences of the color channels are compared to the error threshold. A geometric warping error of a pixel is detected if at least one of the intensity differences of the color channels or the intensity differences of all of the color channels of one individual pixel are higher than the error threshold. A further increase of image quality of the resulting HDR image can thereby be achieved.

According to a fifth implementation form of the second aspect of the present disclosure, the intensity differences are calculated independently for different color channels. Also, independent histograms are calculated for the different color channels. The error threshold is also independently determined for each color channel. The intensity differences of the color channels are compared to the according error thresholds. A warping error of a pixel is detected if at least one of the intensity differences of the color channels is higher than the according error threshold or if the intensity differences of all color channels are higher than the according error thresholds. At the cost of a slightly increased computational complexity a further increase in resulting HDR image quality can thereby be achieved.

According to a sixth implementation form of the second aspect of the present disclosure, search windows of predetermined or user-defined size are set around each pixel of the first warped image, for which geometric warping errors were detected. It is detected, at which pixels within each search window no geometric warping error was detected resulting in valid pixels for each search window. Correction values for the pixels of the first warped image, at which geometric warping errors were detected are calculated each as an average of the intensities of at least some of the valid pixels of the respective search window. The pixels of the first warped image, at which geometric warping errors were detected are replaced by the according calculated correction values resulting in a first error corrected image. At the cost of a low computational complexity, a large quality increase of the resulting high dynamic range image is achieved.

According to a seventh implementation form of the second aspect of the present disclosure, the correction values are each calculated as an average of the intensities of only valid pixels, whose intensity value difference to the intensity value of the presently corrected pixel are below a predetermined or user-selectable correction threshold. The introduction of additional errors is thereby prevented, resulting in a high output image quality.

According to an eighth implementation form of the second aspect of the present disclosure, a weighted map based upon an intensity gradient of the first warped image and the binary map of geometric warping errors is computed. A lower weight is allocated to pixels of high gradient value, such as edges and boundaries and a higher weight is allocated to pixels of low gradient value resulting in a weighted map. The correction values of the pixels are only calculated after the valid pixels of the search windows have been weighted using the weighted map. A further increase in resulting high dynamic range image quality is thereby achieved.

According to a ninth implementation form of the second aspect of the present disclosure, different exposure times of the first image and the second image are compensated by changing a brightness and/or saturation of the first image or the second image resulting in the reference image and the image to be warped. At the cost of a slightly increased computational complexity, a further increase in resulting HDR image quality can be reached. Alternatively, the first image and the second image can be directly used as the reference image and the image to be warped. This results in a lower computational complexity and a slightly lower resulting high dynamic range image quality.

According to a tenth implementation form of the second aspect of the present disclosure, a displacement of image content between the reference image and a further image to be warped derived from a third image is calculated. The estimated displacement is compensated by warping the further image to be warped resulting in a second warped image. Geometric warping errors are detected within the second warped image and compensated resulting in a second error corrected image. The high dynamic range image is calculated from the first error corrected image, the second error corrected image and the reference image. An even higher output image quality can thereby be achieved.

According to a third aspect of the present disclosure, a computer program with program code means for performing some or all previously shown steps or for performing the method according to the second aspect or any of its implementation forms if the program is executed on a computer or a digital signal processor is provided.

According to a fourth aspect of the present disclosure, a computer program product having a computer readable medium with stored program code means for performing some or all previously shown steps or for performing the method according to the second aspect or any of its implementation forms if the program is executed on a computer or a digital signal processor is provided.

Generally, it has to be noted that all arrangements, devices, elements, units and means and so forth described in the present application could be implemented by software or hardware elements of any kind or combination thereof. All steps which are performed by the various entities described in the present application as well as the functionality described to be performed by the various entities are intended to mean that the respective entity is adapted to or configured to perform the respective steps and functionalities. Even if in the following description or specific embodiments, a specific functionality or step to be performed by a general entity is not reflected in the description or is specifically to the element of that entity which performs that specific step or functionality it should be clear for a person skilled in the art that these methods and functionalities can be implemented in respective software or hardware elements, or any combination thereof.

BRIEF DESCRIPTION OF THE DRAWINGS

The present disclosure is in the following explained in detail in relation to embodiments of the disclosure and reference to the enclosed drawings.

DESCRIPTION OF EMBODIMENTS

Figure 1:
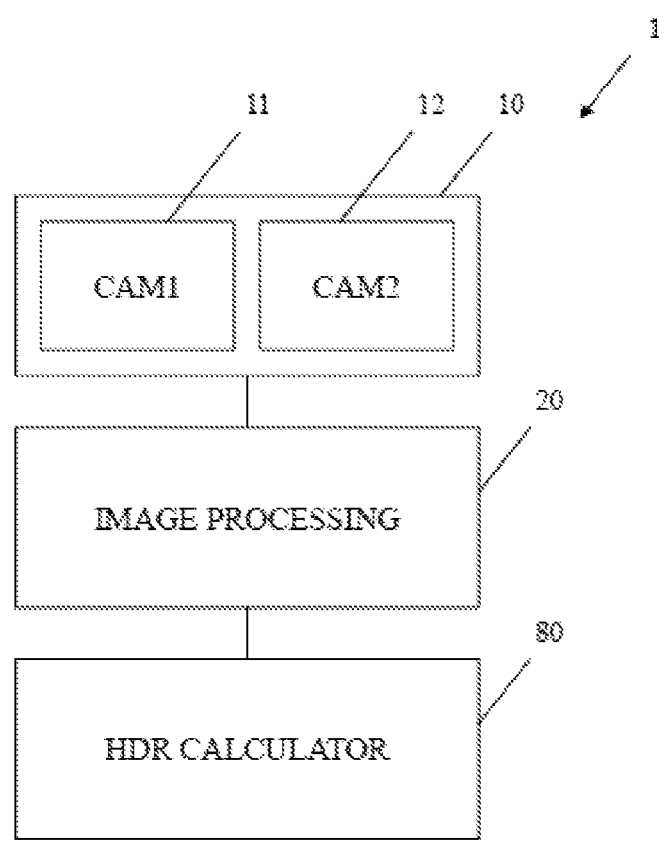
FIG. 1 shows an embodiment of the disclosure.
Figure 2:
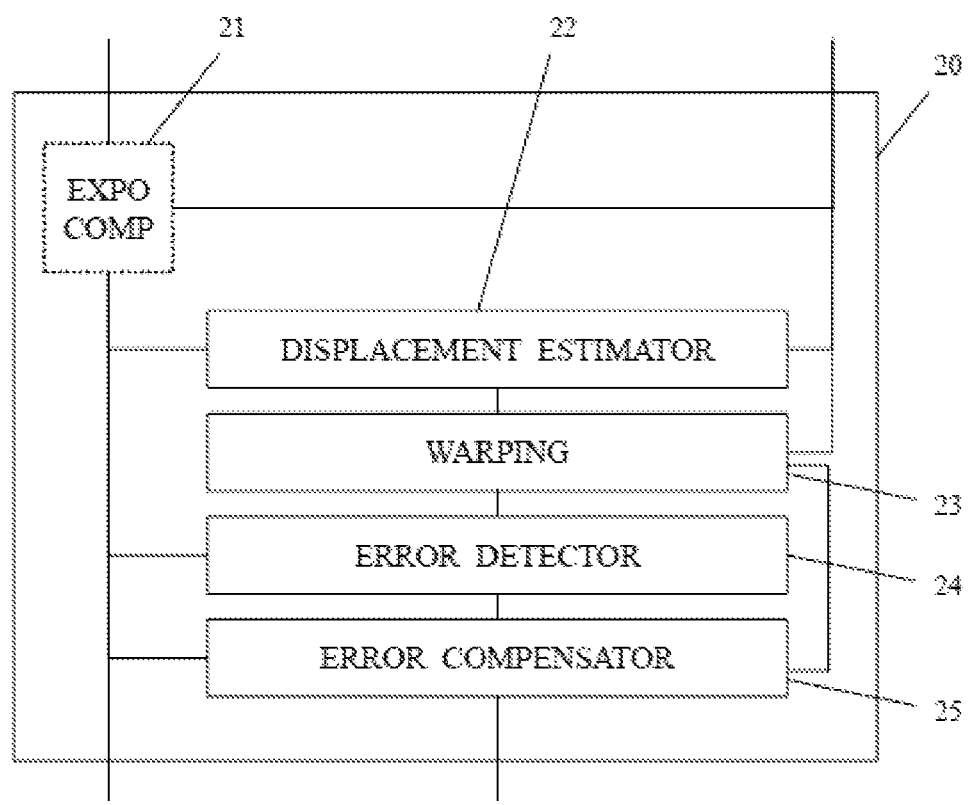
FIG. 2 shows a first detail of the embodiment of the disclosure.
Figure 3:
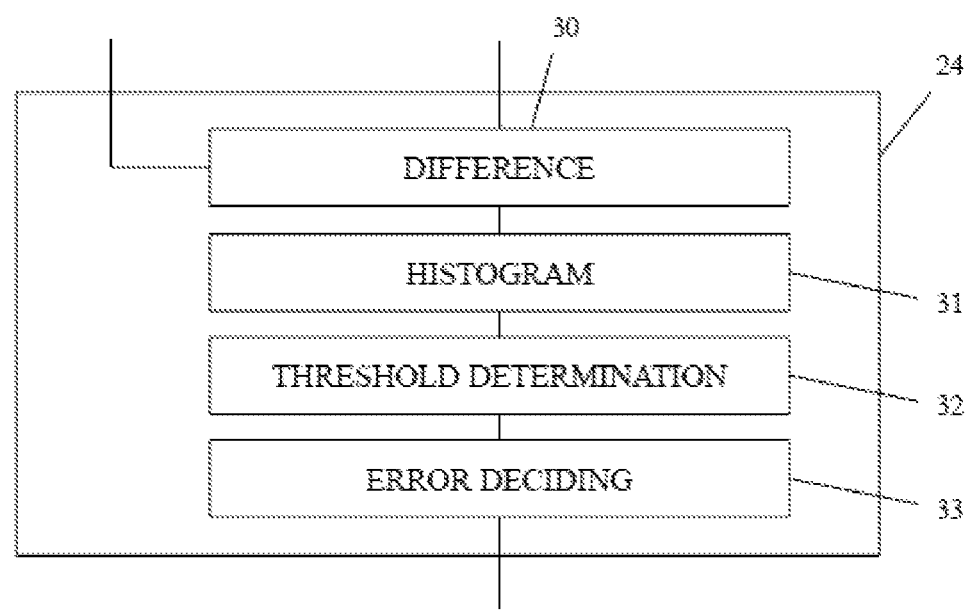
FIG. 3 shows a second detail of the embodiment of the disclosure.
Figure 4:
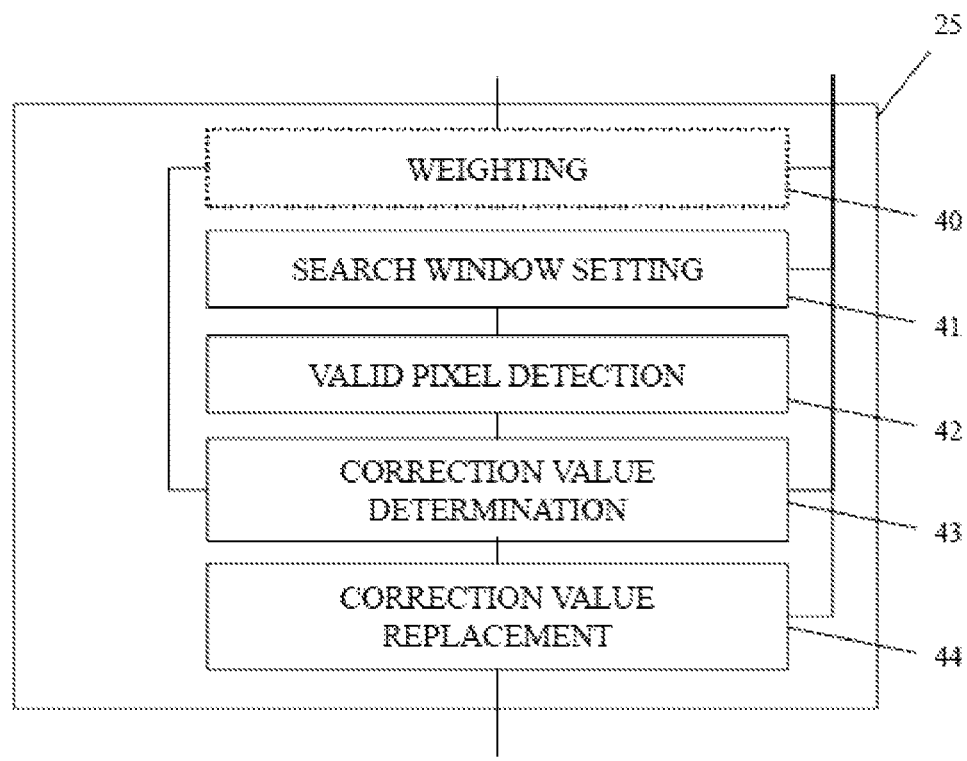
FIG. 4 shows a third detail of the embodiment of the disclosure.

In FIG. 1 an embodiment of the inventive image processing system 1 is shown. The image processing system 1 comprises an image input unit 10, which in turn comprises a first camera 11 and a second camera 12 for simultaneously capturing a first image and a second image. Alternatively, the image input unit 10 can comprise only a single camera for successively capturing a first image and a second image and possibly further images. Moreover, the image processing system does not have to comprise any cameras at all. The image input unit 10 in this case only is an interface for inputting pre-recorded images. Connected to the image input unit is an image processing unit 20 and connected to the image unit processing unit 20 is a HDR calculator 80. The images provided by the image input unit 10 are processed by the image processing unit 20. Details regarding the image processing unit 20 are shown in FIG. 2-FIG. 4. A resulting reference image and at least one resulting error corrected image are handed on to the high dynamic range calculator 80, which calculates the high dynamic range image based upon these images.

In FIG. 2, a first detail of the embodiment of the inventive image processing system shown in FIG. 1 is depicted. Especially, in FIG. 2, the inner workings of the image processing unit 20 of FIG. 1 are shown in detail. The image processing unit 20 comprises optionally an exposure compensation unit 21 adapted to compensate different exposure times of a first image and a second image provided by the image input unit 10 by changing a brightness and/or saturation of the first image and/or of the second image resulting in a reference image and the image to be warped.

Moreover, the image processing unit 20 comprises a displacement estimator 22, which is connected to the image input unit 10 and to the exposure compensation 21. Also, the image processing unit 20 comprises a warping unit 23, which is connected to the displacement estimator 22, to the exposure compensation unit 21 and to the image input unit 10 of FIG. 1. Moreover, the image processing unit 20 comprises an error detector 24, which is connected to the warping unit 23 and the exposure compensation unit 21. Also, the image processing unit 20 comprises an error compensator 25, which is also connected to the error detector 24, to the warping unit 23 and to the exposure compensation unit 21. In case the image processing unit 20 does not comprise an exposure compensation unit 21, the displacement estimator 22, the error detector 24 and the error compensator 25 are directly connected to the image input unit 10 instead of the exposure compensation unit 21.

A first image and a second image are provided to the image processing unit 20 by the image input unit 10. The first image is optionally exposure compensated by the exposure compensating unit 21 by amending its intensity and/or saturation and/or brightness to more closely match the intensity, saturation and brightness of the second image. A resulting reference image and the second image are provided to the displacement estimator 22 which estimates a displacement of image content between the reference image derived from the first image and the image to be warped derived from the second image. In case the exposition compensation is performed, the reference image is the exposition compensated first image. In case the exposition compensation is not performed, the reference image is the first image. In this example, the image to be warped is the second image. Alternatively, the second image could also be exposure compensated to achieve the image to be warped.

The first displacement estimator 22 is advantageously adapted to estimate the displacement of image content by estimating an optical flow and/or by performing a block based search and/or by performing a patch matching.

The estimated displacement of the image content is handed on to the warping unit 23. Moreover, the image to be warped is provided to the warping unit 23. The warping unit is than adapted to compensate the estimated displacement by warping the image to be warped resulting in a first warped image. This first warped image is handed on to the error detector 24. The error detector 24 moreover is provided with the reference image. The error detector detects geometric warping errors within the first warped image. Regarding the function of the error detector, it is referred to later elaborations regarding FIG. 3.

The resulting detected geometric warping errors within the first warped image are handed on to the error compensator 25. The error compensator moreover is provided with the first warped image by the warping unit 23. The error compensator 25 is adapted to compensate the detected geometric warping errors in the first warped image resulting in a first error corrected image. Regarding the function of the error compensator 25 it is referred to later elaborations regarding FIG. 4. The resulting first error corrected image and the reference image are handed on to the high dynamic range calculator 80 of FIG. 1, which calculates the high dynamic range image based upon the first error corrected image and the reference image.

In FIG. 3, a further detail of the embodiment of the inventive image processing system is shown. In FIG. 3, the inner workings of the error detector 24 of FIG. 2 are shown. The error detector 24 comprises a difference unit 30, which is connected to the exposition compensation unit 21 of FIG. 2 and the warping unit 23 of FIG. 2. In case of no exposition compensation unit 21 in FIG. 2, the error detector is connected directly to the image input unit 10 of FIG. 1. Moreover the error detector 24 comprises a histogram unit 31, which is connected to the difference unit 30. Also, it comprises a threshold determination unit 32, which is connected to the histogram unit 31. Furthermore it comprises an error deciding unit 33 connected to the threshold determination unit 32.

The difference unit 30 is provided with the reference image and the first warped image. The difference unit 30 is adapted to compute intensity differences of each pixel of the first warped image to a corresponding pixel of the reference image. The resulting intensity differences are handed on to the histogram unit 31, which is adapted to compute a histogram of the determined intensity differences. The histogram is handed on to the threshold determination unit 32 which is adapted to determine an error threshold from the histogram. This error threshold is selected so that intensity differences below the threshold are considered photometric errors and intensity differences above the threshold are considered geometric errors. The determined error threshold is handed on to the error deciding unit 33, which decides for each calculated intensity difference, if a photometric error or a geometric error is present. The error deciding unit 33 then allows the identification of geometric warping error pixels, for example creating a binary map, where different values are assigned to geometric warping error pixels or photometric errors. In order to limit memory consumption, an indexed table, or a look-up-table can be created, indicating the indexes of the pixel positions where geometric warping errors have been detected.

The error threshold can be determined in different ways, for example computing the gradients between different values of the histogram and placing the threshold in the point where the gradient is maximal. Any other method for computing this threshold, however, can be applied.

Advantageously, if the first image and the second image and therefore also the reference image and the image to be warped are color images, the difference unit 30 is adapted to calculate the intensity differences independently for each color channel. The histogram unit 31 is then also adapted to calculate independent intensity difference histograms for each different color channel. The threshold determination unit 33 is than either adapted to calculate a single error threshold based upon all different intensity difference histograms or to calculate different error thresholds for the different color channels based upon the different color channel intensity difference histograms. The error deciding unit 33 is than adapted to decide between a photometric and a geometric error by comparing the intensity differences of the individual color channels with the respective error thresholds. A geometric error is decided, if at least one of the intensity differences is larger than the respective threshold. Alternatively, to prevent accidental geometric warping error detections, the error deciding unit 33 can also be adapted to decide for a geometric warping error only if all intensity differences of the different color channels are above the respective threshold.

In FIG. 4, a third detail of the embodiment of the inventive image processing system is shown. In FIG. 4, the inner workings of the error compensator 25 of FIG. 2 are shown in a block diagram. The error compensator 25 comprises optionally a weighting unit 40, which is connected to a search window setting unit 41, which again is connected to a valid pixel detection unit 42. The valid pixel detection unit 42 is also connected to a correction value determination unit 43, which again is connected to a correction value replacement unit 44. The weighting unit 40 is furthermore connected to the correction value determination unit 43. The weighting unit 30, the search window setting unit 41, the correction value determination unit 43 and the correction unit replacement unit 44 are furthermore provided with the first warped image.

The weighting unit 40 is provided with the binary map of geometric warping error pixels by the error detector 24 of FIG. 2. The weighting unit 40 then optionally performs a weighting of pixels selected by the search window setting unit 41 based on the binary map of the geometric warping errors and the intensity gradients of the first warped image. A lower weight is allocated to pixels of high gradient values, such as edges and boundaries. A higher weight is allocated to pixels of low gradient value, resulting in a weighted map Therefore, pixels along borders and edges are reduced in importance in comparison to pixels, which lie, for example in flat regions.

The search window setting unit 41 is adapted to set search windows of predetermined or user-defined size around each pixel of the first warped image, for which geometric warping errors were detected. Information regarding these search windows is handed on to the valid pixel detection unit 42, which determines, using the information of the binary map, at which pixels within each search window no geometric warping error was detected resulting in valid pixels for each search window. The information regarding the valid pixels is handed on to the correction value determination unit 43, which calculates correction values for the pixels of the first warped image, at which geometric warping errors were detected by calculating an average of the intensities of at least some of the valid pixels of the search window. The weighted map provided by the weighting unit 40 is used for weighting the valid pixels of the search windows before calculating the correction values.

The resulting correction values are handed on to the correction value replacement unit 44, which replaces the pixels of the first warped image, at which geometric warping errors were detected by the according calculated correction values resulting a first error corrected image.

The binary map is also updated accordingly, setting the value of the pixel, at which geometric warping errors were detected, as valid pixel.

This error corrected image is handed on to the high dynamic range calculator 80 of FIG. 1 for calculating the high dynamic range image.

Alternatively, not only two images, but three or more images can be used for calculating the high dynamic range image. In this case, one of the images is used as a reference image as described above. The other two images are handled just as the second image was handled in the above shown description. Therefore, a second image and a third image are used as an image to be warped and a further image to be warped. For handling the further image to be warped, a second displacement estimator, a second warping unit, a second error detector and a second error compensator are used. A resulting second error corrected image is then handed on to the HDR calculator 80 of FIG. 1. The HDR calculator 80 of FIG. 1 than calculates the high dynamic range image form the reference image, the first error corrected image and the second corrected image.

Figure 5:
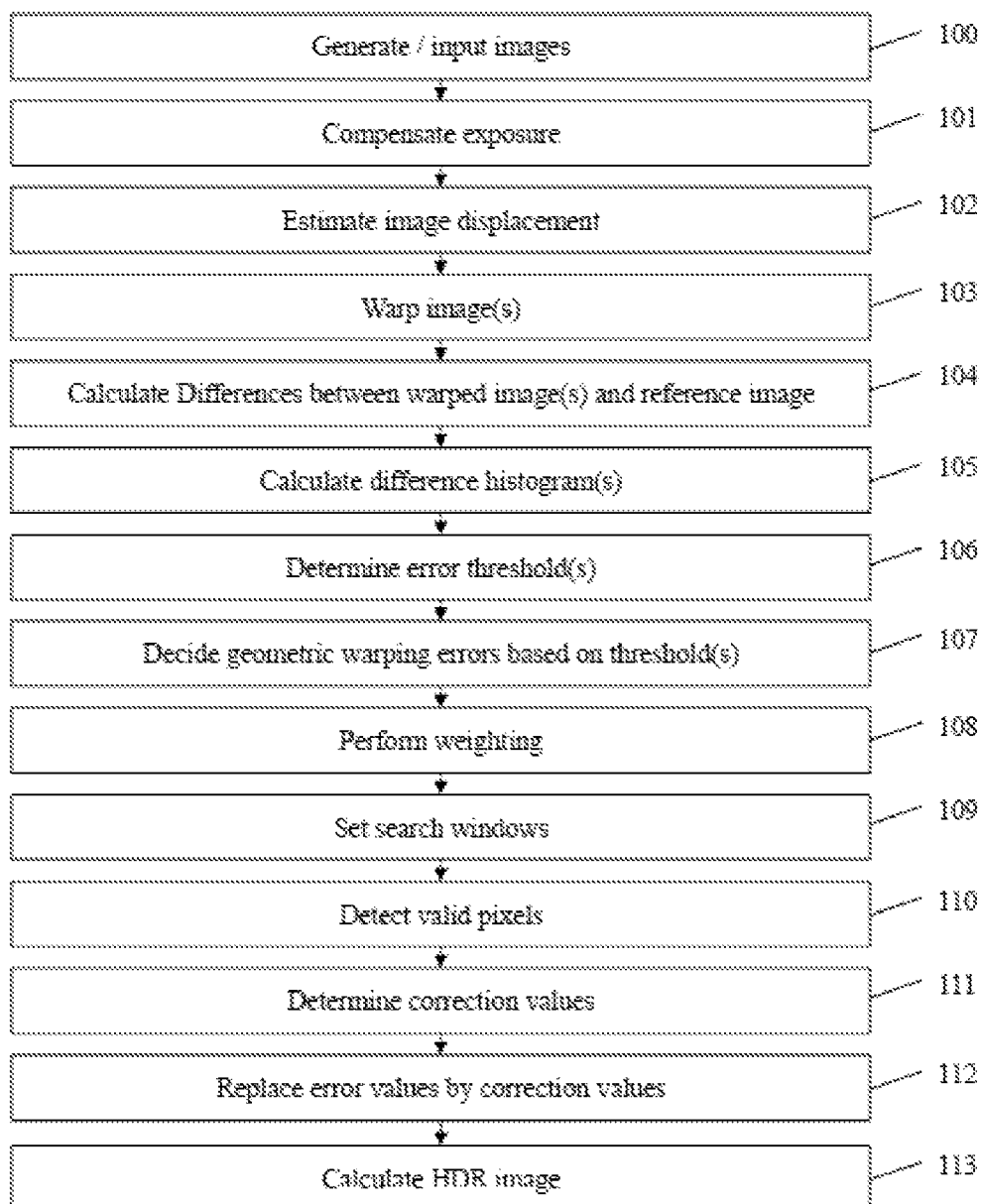
FIG. 5 shows an exemplary method of the disclosed embodiments.

In FIG. 5, an embodiment of the inventive method is shown. In a first step 100, a first image and a second image are either generated, for example by recording them with a camera or merely input. In a second step 101 an exposure compensation is performed by amending a brightness, a saturation or an intensity of at least one of the images. The exposure compensation of step 101 is an optional step. In a third step 102 a displacement of image content of a reference image derived from the first image and an image to be warped derived from the second image is calculated.

In a fourth step 103, the image to be warped, which is derived from the second image is warped based upon the calculated displacement of step 102. The warping is performed so that the displacement is compensated. In a fifth step 104 intensity differences between the warped image and the reference image are calculated. The differences are calculated on a pixel-basis. These differences are calculated either based merely upon the intensity of the individual pixels, but alternatively can also be calculated independently for different color channels.

In a sixth step 105, a difference histogram is calculated based upon the determined intensity differences of step 104. Either only one difference histogram is calculated or several difference histograms are calculated for different color channels. In a seventh step 106, at least one error threshold is calculated based upon the difference histograms. Either one error threshold or one error threshold for each color channel are calculated. The error thresholds are chosen so that intensity difference values below the threshold indicate photometric errors, while intensity difference values above the threshold indicate geometric warping errors.

In an eighth step 107, geometric warping errors are decided upon based on the thresholds. The eighth step 107 results in a binary map of geometric warping errors. In a ninth step 108 the weighted map based on binary map of geometric warping errors and intensity gradients of the first warped image is computed. A lower weight is allocated to pixels of high gradient values such as edges and boundaries and a higher weight is allocated to pixels of low gradient value resulting in a weighted map. The ninth step 108 is also an optional step.

In a tenth step 109, search windows are set around each pixel of the first warped image, for which a geometric warping error was detected. The search windows are of a predefined or user-defined size. In an eleventh step 110, valid pixels within the search windows are detected by determining, for which pixels within the search window, no geometric warping error was detected. In a twelfth step 111, correction values are determined for all pixels of the first warped image, at which geometric warping errors were detected. The correction values are determined by calculating an average of the intensities of at least some of the valid pixels of the search window. While calculating this average, the weighted map created in step 108 is used for weighting the individual pixel within the search window accordingly.

In a thirteenth step 112, the values of the first warped image, at which geometric warping errors were detected are replaced by the according calculated correction values resulting in a first error corrected image and the binary map is updated accordingly. In a fourteenth step 113, an HDR image calculated from the reference image and the first error corrected image.

Optionally, the above-mentioned steps are furthermore performed on a third image resulting in a further image to be warped. A second error corrected image is the result of this processing. The high dynamic range image is then calculated in step 113 based upon the reference image, the first error corrected image and the second error corrected image.

The disclosure is not limited to the examples shown. The characteristics of the exemplary embodiments can be used in any advantageous combination.

What is claimed is:

1. An image processing system for generating a high dynamic range image from a first image and a second image, comprising:
   a memory comprising instructions; and
   a processor coupled to the memory, wherein the instructions cause the processor to be configured to:
      estimate a displacement of image content between a reference image derived from the first image and an image to be warped derived from the second image;
      compensate the estimated displacement by warping the image to be warped to generate a first warped image;
      compute intensity differences between each pixel of the first warped image to a corresponding pixel of the reference image;
      compute a histogram of the computed intensity differences;
      adaptively determine an error threshold by analyzing gradients of consecutive values of the histogram and selecting the error threshold as a value where the gradient is maximal;
      detect geometric warping errors within the first warped image based on the error threshold;
      compensate the detected geometric warping errors in the first warped image resulting in a first error corrected image; and
      calculate the high dynamic range image based upon the first error corrected image and the reference image.

2. The image processing system according to claim 1, wherein the instructions further cause the processor to be configured to estimate the displacement of the image content by at least one of:
   estimating an optical flow;
   performing a block based search; and
   performing a patch matching.

3. The image processing system according to claim 1, wherein the instructions further cause the processor to be configured to:
   determine the error threshold from the histogram; and
   determine geometric warping errors by comparing the intensity differences to the error threshold resulting in a binary map of geometric warping error pixels.

4. The image processing system according to claim 3, wherein the instructions further cause the processor to be configured to determine the error threshold so that difference values below the error threshold indicate photometric warping errors and values above the error threshold indicate geometric warping errors.

5. The image processing system according to claim 3, wherein the instructions further cause the processor to be configured to:
   compute the intensity differences independently for different color channels;
   compare the intensity differences of the different color channels to the error threshold; and
   determine a geometric warping error of a pixel when at least one of the intensity differences of the different color channels is higher than the error threshold, or when intensity differences of all color channels are higher than the error threshold.

6. The image processing system according to claim 3, wherein the instructions further cause the processor to be configured to:
   compute the intensity differences independently for different color channels;
   compute independent histograms for the different color channels;
   determine an independent error threshold for each color channel;
   compare the intensity differences of the color channels to corresponding error thresholds; and
   determine a warping error of a pixel when at least one of the intensity differences of the color channels is higher than the corresponding error threshold, or when intensity differences of all color channels are higher than the corresponding error thresholds.

7. The image processing system according to claim 3, wherein the instructions further cause the processor to be configured to:
   set search windows of predetermined or user-defined size around each pixel of the first warped image, for which a geometric warping error was detected;
   determine at which pixels within each search window no geometric warping error was detected resulting in valid pixels for each search window;
   calculate correction values for the pixels of the first warped image, at which geometric warping errors were detected, each as an average of intensities of at least some of the valid pixels of the search window; and
   replace the pixels of the first warped image, at which geometric warping errors were detected, by corresponding calculated correction values resulting in the first error corrected image.

8. The image processing system according to claim 7, wherein the instructions further cause the processor to be configured to calculate the correction values each as an average of intensities of only valid pixels, whose intensity value difference to the intensity value of a presently corrected pixel are below a predetermined or user-selectable correction threshold.

9. The image processing system according to claim 7, wherein the instructions further cause the processor to be configured to;
   compute a weighted map based on the binary map of geometric warping errors and intensity gradients of the first warped image, wherein a lower weight is allocated to pixels of high gradient value, such as edges and boundaries, and wherein a higher weight is allocated to pixels of low gradient value, resulting in a weighted map; and
   weight the valid pixels of the search windows using the weighted map before calculating the correction values.

10. The image processing system according to claim 1, wherein the instructions further cause the processor to be configured to compensate different exposure times of the first image and the second image by changing at least one of a brightness and saturation of the first image or of the second image resulting in the reference image and the image to be warped.

11. The image processing system according to claim 1, wherein the instructions further cause the processor to be configured to:
   estimate displacement of image content between the reference image and a further image to be warped derived from a third image;
   compensate the estimated displacement by warping the further image to be warped resulting in a second warped image;
   detect geometric warping errors within the second warped image;
   compensate the detected geometric warping errors in the second warped image resulting in a second error corrected image; and calculate the high dynamic range image based on the first error corrected image, the second error corrected image and the reference image.

12. A method for generating a high dynamic range image from a first image and a second image, comprising:
   estimating with a processor, displacement of image content between a reference image derived from the first image and an image to be warped derived from the second image;
   compensating, with the processor, the estimated displacement by warping the image to be warped to generate a first warped image;
   computing, with the processor, intensity differences between each pixel of the first warped image to a corresponding pixel of the reference image;
   computing, with the processor, a histogram of the computed intensity differences;
   adaptively determining, with the processor, an error threshold by analyzing gradients of consecutive values of the histogram and selecting the error threshold as a value where the gradient is maximal;
   detecting, with the processor, geometric warping errors within the first warped image based on the error threshold;
   compensating, with the processor, the detected geometric warping errors in the first warped image to generate a first error corrected image; and
   calculating, with the processor, the high dynamic range image based on the first error corrected image and the reference image.

13. A non-transitory computer readable medium including at least one computer program code stored therein for generating a high dynamic range image associated with a computing device when executed on a processor, the computer readable medium causes the processor to:
   estimate displacement of image content between a reference image derived from a first image and an image to be warped derived from a second image;
   compensate the estimated displacement by warping the image to be warped to generate a first warped image;
   compute intensity differences between each pixel of the first warped image to a corresponding pixel of the reference image;
   compute a histogram of the computed intensity differences;
   adaptively determine an error threshold by analyzing gradients of consecutive values of the histogram and selecting the error threshold as a value where the gradient is maximal;
   detect geometric warping errors within the first warped image based on the error threshold;
   compensate the detected geometric warping errors in the first warped image to generate a first error corrected image; and
   calculate a high dynamic range image based on the first error corrected image and the reference image.

14. The method according to claim 12, further comprising estimating the displacement of the image content by at least one of estimating an optical flow, performing a block based search, and performing a patch matching.

15. The method according to claim 12, further comprising:
   determining an error threshold from the histogram; and
   determining geometric warping errors by comparing the intensity differences to the threshold resulting in a binary map of geometric warping error pixels.

16. The method according to claim 15, further comprising:
   computing the intensity differences independently for different color channels;
   comparing the intensity differences of the color channels to the error threshold; and
   determining a geometric warping error of a pixel when at least one of the intensity differences of the color channels is higher than the error threshold, or when intensity differences of all color channels are higher than the error threshold.

17. The method according to claim 15, further comprising:
   computing the intensity differences independently for different color channels;
   computing independent histograms for the different color channels;
   determining an independent error threshold for each color channel;
   comparing the intensity differences of the color channels to corresponding error thresholds; and
   determining a warping error of a pixel when at least one of the intensity differences of the color channels is higher than the corresponding error threshold, or when intensity differences of all color channels are higher than the corresponding error thresholds.

18. The method according to claim 15, further comprising:
   setting search windows of predetermined or user-defined size around each pixel of the first warped image, for which a geometric warping error was detected;
   determining at which pixels within each search window no geometric warping error was detected resulting in valid pixels for each search window;
   calculating correction values for the pixels of the first warped image at which geometric warping errors were detected, as an average of intensities of at least some of the valid pixels of the search window; and
   replacing the pixels of the first warped image at which geometric warping errors were detected using corresponding calculated correction values to obtain the first error corrected image.

19. The method according to claim 18, further comprising calculating the correction values each as an average of intensities of only valid pixels, whose intensity value difference to the intensity value of a presently corrected pixel are below a predetermined or user-selectable correction threshold.

20. The method according to claim 18, further comprising:
   computing a weighted map based on the binary map of geometric warping error pixels and intensity gradients of the first warped image, wherein a lower weight is allocated to pixels of high gradient value, such as edges and boundaries, wherein a higher weight is allocated to pixels of low gradient value, resulting in a weighted map; and
   weighting the valid pixels of the search windows using the weighted map before calculating the correction values.

* * * * *